United States Patent
Yamamoto et al.

(12) 
(10) Patent No.: US 6,670,993 B1
(45) Date of Patent: Dec. 30, 2003

(54) IMAGE PICKUP DEVICE AND METHOD FOR CONTROLLING A DYNAMIC RANGE OF AN IMAGE SENSOR

(75) Inventors: Yasutoshi Yamamoto, Hirakata (JP); Masayuki Yoneyama, Takatsuki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/231,830

(22) Filed: Jan. 15, 1999

(30) Foreign Application Priority Data

Jan. 16, 1998 (JP) ............................. 10-006609

(51) Int. Cl.[7] ........................ H04N 5/235; H04N 5/238
(52) U.S. Cl. ........................ 348/362; 348/363; 348/364
(58) Field of Search ................................ 348/364, 363, 348/366, 362, 296

(56) References Cited

U.S. PATENT DOCUMENTS

| | | | | |
|---|---|---|---|---|
| 5,194,960 A | * | 3/1993 | Ota | .............................. 358/228 |
| 5,416,611 A | | 5/1995 | Tandon | |
| 5,579,049 A | * | 11/1996 | Shimaya | ....................... 348/364 |
| 5,589,880 A | | 12/1996 | Tsukui | |
| 5,969,761 A | * | 10/1999 | Takahashima | ................ 348/362 |
| 6,104,433 A | * | 8/2000 | Sano | ............................. 348/363 |
| 6,219,097 B1 | * | 4/2001 | Kamishima | .................. 348/362 |
| 6,249,317 B1 | * | 6/2001 | Hashimoto et al. | .......... 348/364 |
| 2001/0008419 A1 | * | 7/2001 | Toshiyuki et al. | ........... 348/362 |

FOREIGN PATENT DOCUMENTS

JP      7-322147      12/1995

* cited by examiner

Primary Examiner—Wendy R. Garber
Assistant Examiner—Catherine J. Toppin
(74) Attorney, Agent, or Firm—Wenderoth, Lind & Ponack, L.L.P.

(57) ABSTRACT

In an image pickup device, a signal mixer 7 mixes the image signals of different quantities of exposure outputted by an image sensor 4. A peak level detector 12 detects peak level of the mixed signal, and a peak level judge 13 decides whether the peak level is within a predetermined range or not. A controller 6 controls a ratio of the quantities of exposure for the image sensor 4 according to the decision by the peak level judge. Thus, the image pickup device has a good dynamic range in correspondence a dynamic range of an object, and an object image is reproduced well. Further, an iris device is also controlled appropriately when the dynamic range is controlled.

19 Claims, 9 Drawing Sheets

IMAGE PICKUP DEVICE AND METHOD FOR CONTROLLING A DYNAMIC RANGE OF AN IMAGE SENSOR

BACKGROUND OF THE INVENTION

1. Field of the Invention

The present invention relates to an image pickup device used in a video camera or the like.

2. Description of Prior Art

An image pickup device used in a video camera or the like detects and mixes image signals for different quantities of exposure to provide video signals in a wide dynamic range. The image pickup device has an image sensor which outputs image signals for different quantities of exposure. The image sensor is called, for example, a progressive scan type and it has photoelectric conversion sections or pixels arranged in two dimensions and outputs image signals in scan lines having a number twice that of an ordinary image sensor. In the image sensor, exposure time for pixels in correspondence to a half of the scan lines is changed by an electronic shutter to output image signal $S_{long}$ for a darker object and image signal $S_{short}$ for a brighter object. A mixed signal $S_{mix}$ is obtained from the image signals $S_{long}$ and $S_{short}$ and it is subjected to image processes necessary for a camera such as gamma correction and aperture correction. Further, a mean signal level over a screen is detected, and an iris device is controlled to have a predetermined value according to the mean level of the screen. Such a prior art image pickup device is described in Japanese Patent laid open Publication 322147/1995.

Figure 1:
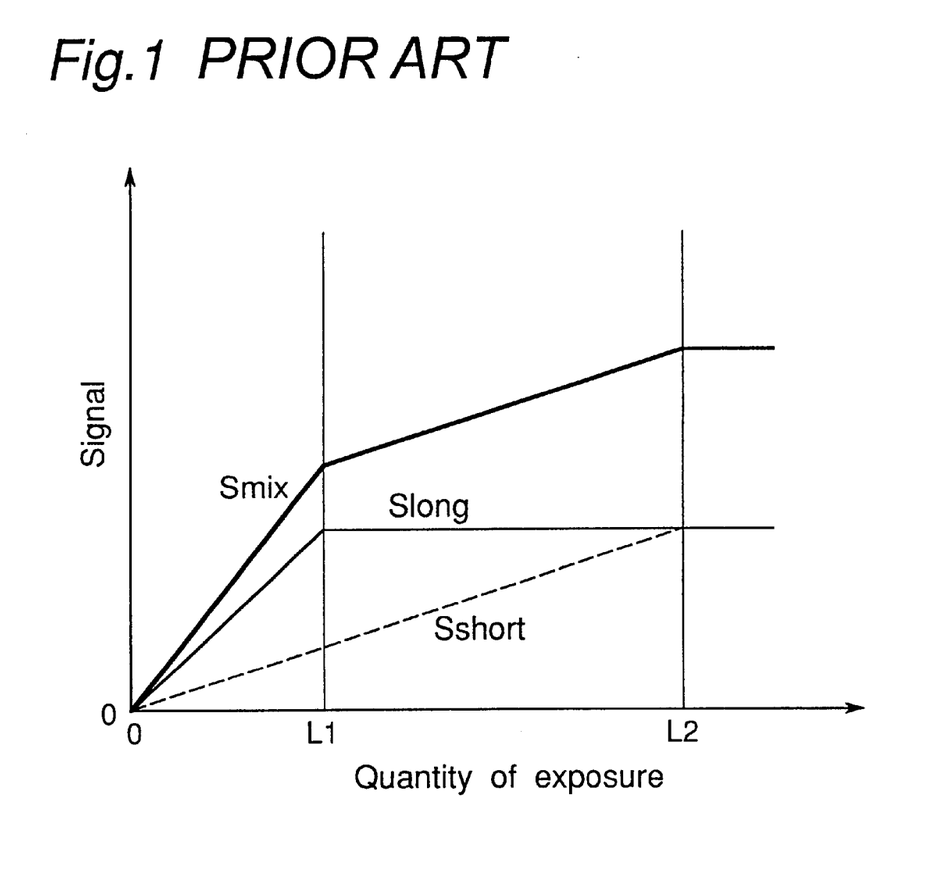
FIG. 1 is a diagram for illustrating the relationship between image signals in the prior art device schematically.

In the prior art image pickup device, as shown in FIG. 1, the image signal $S_{long}$ saturates at a quantity of incident light L1, and the image signal $S_{short}$ saturates at a quantity of incident light L2 which is larger than L1. On the other hand, the dynamic range represented as L2/L1 is constant. Therefore, an image of an object cannot be reproduced well when the dynamic range of the object is larger than the dynamic range L2/L1 of the image pickup device or smaller largely than L2/L1.

SUMMARY OF THE INVENTION

An object of the present invention is to provide an image pickup device which can control a dynamic range for a camera in correspondence to the dynamic range of an object.

Another object of the present invention is to provide an image pickup device which performs stable iris control when the dynamic range of the camera is changed.

An image pickup device comprises: an optical lens which transmits a light from an object; an image sensor which detects the light incoming from the optical lens to output image signals for different quantities of exposure; a driver which drives the image sensor; a signal mixer which mixes the image signals for different quantities of exposure outputted by the image sensor to output a mixed signal; a peak level detector which detects a peak level of one of the image signals for different quantities of exposure or a signal derived from the image signals for different quantities of exposure; a peak level judge which judges whether the peak level detected by the peak level detector is within a predetermined range or not; and a controller which controls a ratio of the quantities of light for the image sensor according to the judge result by the peak level judge. Thus, the dynamic range of a camera can be controlled optimally according to the dynamic range of the image sensor by controlling the quantities of exposure for the image sensor according to the peak level which represents brightness of the object.

For example, the peak level detector detects a peak level of the mixed signal outputted by the signal mixer.

For example, the peak level detector detects the peak level of the image signals for a smallest quantity of exposure. Then, the peak level is stabilized while the dynamic range is controlled.

Further, preferably, the image pickup device further comprises: an iris device which limits the light propagating from the optical lens to the image sensor; a signal level judge which receives the mixed signals from the signal mixer and outputs the mixed signals only within a predetermined range; and a mean signal level detector which detects a mean signal level of the image signals received from the signal level judge to output a mean signal level; and an iris driver which controls the iris device according to the mean signal level outputted by the mean signal level detector so as to control the light entering through the optical lens to the image sensor. Thus, the iris device can be controlled stably when the dynamic range of the image pickup device is controlled according to that of the object.

Further, preferably, the image pickup device further comprises: an iris device which limits the light propagating from the optical lens to the image sensor; a mean signal level detector which averages the image signals for the maximum quantity of exposure outputted by the image sensor to output a mean signal level; and an iris driver which controls the iris device according to the mean signal level outputted by the mean signal level detector so as to control the light entering through the optical lens to the image sensor. Thus, the iris device can be controlled stably while controlling the dynamic range of the image pickup device optimally.

Further, preferably, the image pickup device further comprises a limiter which limits a ratio of the quantities of exposure of the image signal controlled by the controller within a predetermined range. As a result, occurrences of the gradation characteristic becoming unnatural and an increase of noises can be advantageously suppressed.

Further, preferably, the image pickup: device further comprises a calculator which calculates a ratio of quantities of exposure of the image signals outputted by the image sensor and a quantity of incident light incoming through the iris device to the image sensor by using calculation with the peak level and the mean signal level. Even if the enlargement of the dynamic range is limited, the iris operation is correlated to the enlargement of the dynamic range. Thus, a ratio of saturated signals is reduced,and an object can be imaged in a suitable state.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the drawings, wherein like reference characters designate like or corresponding parts throughout the several views, various embodiments of the invention are explained.

First Embodiment

An image pickup device according to a first embodiment of the invention controls the quantity of exposure of an image sensor according to the peak level which represents the maximum brightness or illuminance of an object. Thus, the dynamic range of the camera is controlled according to the dynamic range of the object.

Figure 2:
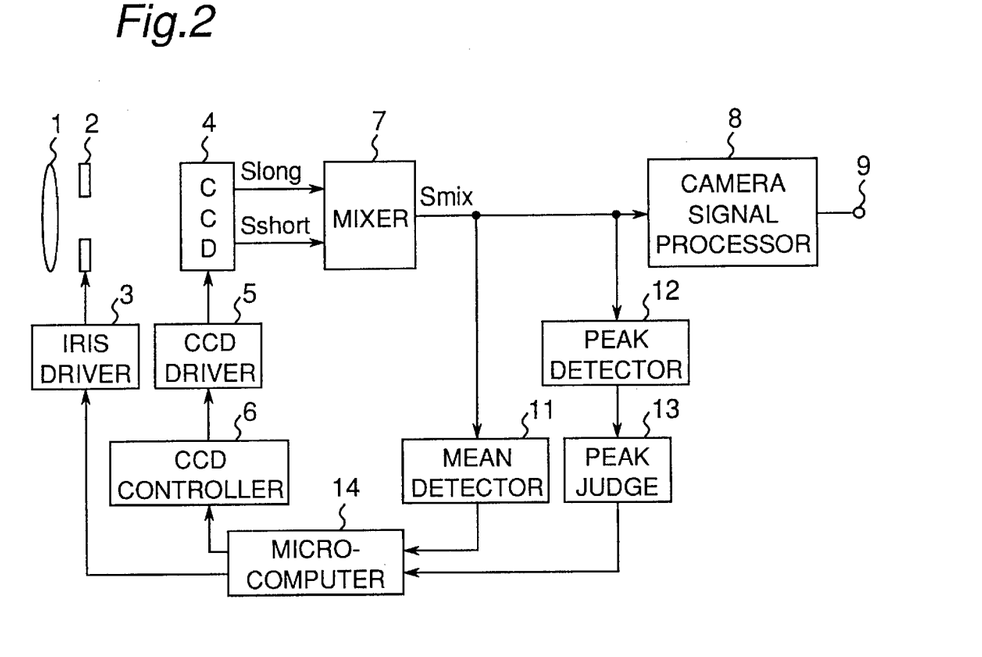
FIG. 2 is a block diagram of a main portion of an image pickup device according to a first embodiment of the invention.
Figure 3:
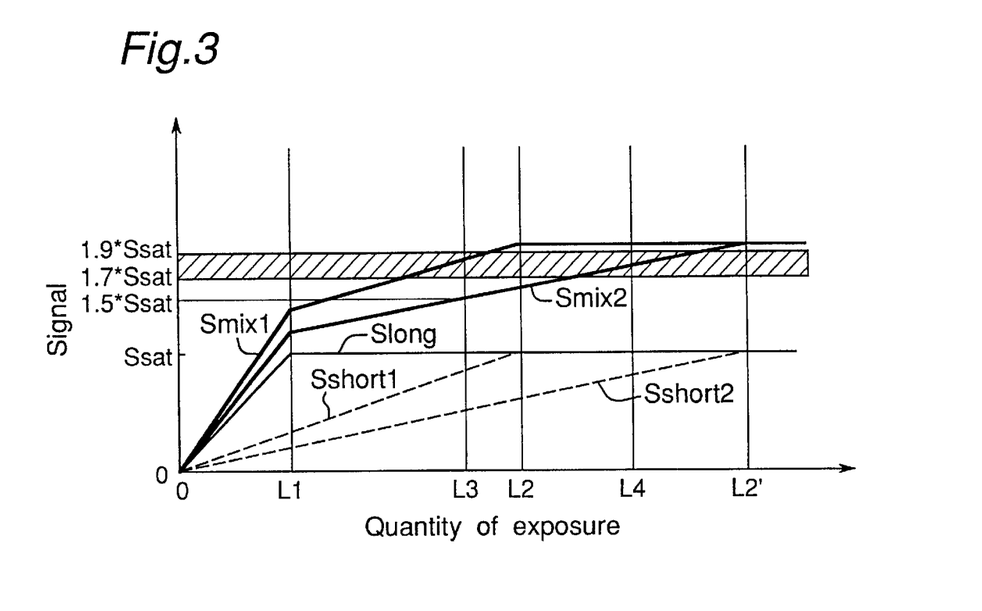
FIG. 3 is a diagram for illustrating the relationship between image signals in the first embodiment of the invention schematically.

FIG. 2 schematically shows the image pickup device according to the first embodiment of the invention. In the image pickup device, a light from an object transmits through an optical lens 1, is stopped down by an iris device 2 and enters into an image sensor 4 such as a charged-coupled device (CCD). The image sensor 4 is an element which outputs image signals for different quantities of exposure, and it is driven by an image sensor driver (CCD driver) 5 controlled by a controller 6. For example, the quantity of exposure is an exposure time. However, it is not limited thereto and, for example, light intensity may also be incorporated with the exposure time. The image sensor is usually an image sensor of progressive scan type and it can output image signals of a scan line number twice that of an ordinary image sensor, wherein an exposure time for the pixels in correspondence to a half of the scan lines is changed to a smaller exposure time than that for an ordinary case by an electronic shutter (not shown). Then, two image signals outputted by the image sensor 4 have different quantities of exposure time, that is, an ordinary image signal $S_{long}$ for a longer exposure time and an electronic shutter image signal $S_{short}$ having a shorter exposure time. In an example shown in FIG. 3 illustrating the relationship between image signals, the image signal $S_{long}$ saturates at a quantity of incident light L1, and the image signal $S_{short}$ saturates at a quantity of incident light L2 larger than L1 at the same saturation level $S_{sat}$.

A signal mixer 7 simply sums the image signals $S_{long}$ and $S_{short}$ outputted from the image sensor 4 to provide a mixed signal $S_{mix}$. The output signal from the image mixer 7 is sent to a camera signal processor circuit 8 which subjects the input mixed signal $S_{mix}$ to signal processing such as gamma correction and aperture correction. Then it outputs image signals through the output terminal 9 to the external.

On the other hand, a peak level detector 12 receives the mixed signal $S_{mix}$ to detect a peak level for a screen according to the mixed signal $S_{mix}$ and outputs it to a peak level judge 13. The peak level judge 13 judges whether the peak level is within a predetermined range or not. The range is, for example, from 1.7 to 1.9 times the saturation level $S_{sat}$ of the image signals $S_{long}$ and $S_{short}$ (between $1.7*S_{sat}$ and $1.9*S_{sat}$). FIG. 3 shows a range where the peak level exists, besides the relationship of the image signals $S_{long}$ and $S_{short}$.

A microcomputer 14 controls the controller 6 for the image sensor driver 5 according to the judge result of the peak level judge 13. The ratio of the dynamic ranges is increased when the peak level is larger than the predetermined range, while it is decreased when the peak level is smaller than the predetermined range. When the ratio of the dynamic ranges is increased according to a control signal of the microcomputer 14, the controller 6 for the image sensor driver 5 increases a ratio of the two exposure times. On the other hand, when the ratio of the dynamic ranges is increased according to the control signal of the microcomputer 14, the controller 6 for the image sensor driver 5 increases the ratio of the two exposure times. In this embodiment, the exposure time for the signal $S_{short1}$ for the smaller quantity of exposure is adjusted. The exposure time is controlled by adjusting the shutter speed of the electronic shutter.

On the other hand, a mean signal detector 11 also receives the mixed signal $S_{mix}$, and detects a mean signal level for one screen, which is transmitted to the microcomputer 14. The microcomputer 14 controls the iris device 2 by the iris driver 3 so that the mean signal level for one screen becomes a predetermined value.

FIG. 3 shows two examples. For an object having the maximum quantity of exposure L3 of incident light, the quantity of exposure L3 is included in the predetermined range by setting the ratio of quantities of exposure to L2/L1 to 3 by the microcomputer 14. In this case, the image sensor 4 outputs image signal $S_{short1}$ having a shorter exposure time, and the signal mixer 7 outputs the mixed signal $S_{mix1}$. On the other hand, for an object having the maximum quantity of exposure L4 of incident light, the quantity of exposure L4 is included in the predetermined range by setting the ratio of quantities of exposure to L2/L1 to 4 by the microcomputer 14. In this case, the image sensor 4 outputs image signal $S_{short2}$ having a shorter exposure time, and the image mixer 7 outputs the mixed signal $S_{mix2}$. The peak level is increased to L2' which is larger than L2, and the mixed signal $S_{mix2}$ has a smaller slope than the mixed signal $S_{mix1}$. Thus, the dynamic range of the image pickup device is controlled in correspondence to the dynamic range of the object.

In the prior art image pickup device shown in FIG. 1, because the dynamic range represented as L2/L1 is constant. Then, if the maximum quantity of incident light from the object is L3, the image can be reproduced, whereas if the maximum quantity of incident light from the object is L4, the image cannot be reproduced. On the other hand, if the maximum quantity of incident light from the object is L4, the maximum output level is about 1.5 times the saturation level $S_{sat}$ of $S_{long}$, and the dynamic range for the image pickup device cannot be used effectively. As explained above, in the image pickup device of this embodiment, the dynamic range of the image pickup device is controlled optimally according to that of the object, and for an object having the maximum quantity of incident light of L4, the image can be reproduced well. That is, by controlling the quantity of exposure of image sensor according to the peak level which represents the maximum brightness of an object, the dynamic range of the camera can be controlled optimally according to the dynamic range of the object.

Second Embodiment

In the image pickup device according to the first embodiment explained above, the iris device is controlled according to a mean value of image signals. Then, the iris controller may become unstable when the mean signal level is changed according to enlargement of the dynamic range because the iris device is controlled according to a mean value of signals in the enlarged dynamic range. This is explained with reference to FIG. 5. For an object having uniform signal distribution up to brightness L2', the mean signal level is taken as an area enclosed by $S_{max}$ and L2'. If compared with a case of a smaller dynamic range ($S_{mix1}$), the area is smaller and the mean signal level becomes smaller in a case of a larger dynamic range ($S_{mix2}$). Then, the iris device 2 is opened further though the dynamic range is enlarged. An image pickup device according to a second embodiment solves this problem and controls the iris device stably even when the dynamic range is enlarged.

Figure 4:
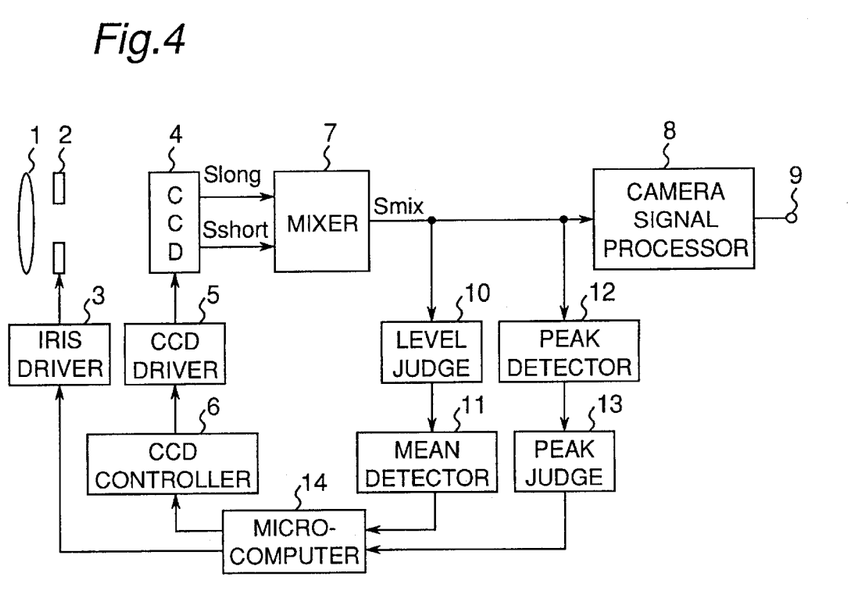
FIG. 4 is a block diagram of a main portion of an image pickup device according to a second embodiment of the invention.

FIG. 4 shows an image pickup device according to a second embodiment of the invention. The image pickup device according to this embodiment adds a signal level judge 10 to the image pickup device of the first embodiment. In the image pickup device, the structure and the operation of parts other than the signal level judge 10 and the mean signal level detector 11 are similar to the counterparts in the image pickup device of the first embodiment, and the similar explanation is omitted here.

The signal level judge 10 decides whether the level of the mixed signal $S_{mix}$ received from the signal mixer 7 is within a predetermined level range or not. Then, it outputs only the mixed signals $S_{mix}$ having levels smaller than the saturation level $S_{sat}$ of the image signal $S_{long}$, $S_{short}$ to the mean signal level detector 11. The mean signal level detector 11 averages the signals received from the signal level judge 10 over one screen and transmits the mean value to the microcomputer 14. The microcomputer 14 controls the iris device 2 by the iris controller 3 according to the mean signal level detected by the mean signal level detector 11. Therefore, even when the dynamic range is increased, the iris device is controlled stably. The processing of signals after the microcomputer 14 is similar to the image pickup device of the first embodiment, and the similar explanation is omitted here.

Figure 5:
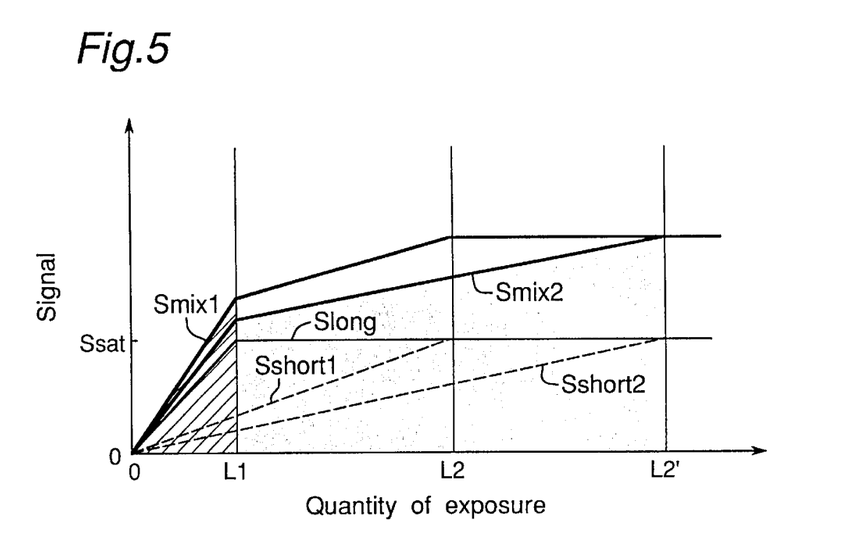
FIG. 5 is a diagram for illustrating the relationship between image signals in the second embodiment of the invention schematically.

FIG. 5 illustrates the relationship between image signals $S_{short}$, $S_{long}$ and $S_{mix}$ in the image pickup device. As to signals for incident light having a quantity of exposure smaller than L1, the mean signal level of the mixed signal $S_{mix}$ is taken as a triangular area enclosed by $S_{mix}$ and L1, and the characteristics of the signals are not changed practically when the dynamic range of the image sensor is changed according to that of an object. Therefore, the iris control becomes stable.

Third Embodiment

An image pickup device according to a third embodiment of the invention can control the iris device stably when the dynamic range of the image sensor is enlarged by adopting a different structure from that of the second embodiment.

Figure 6:
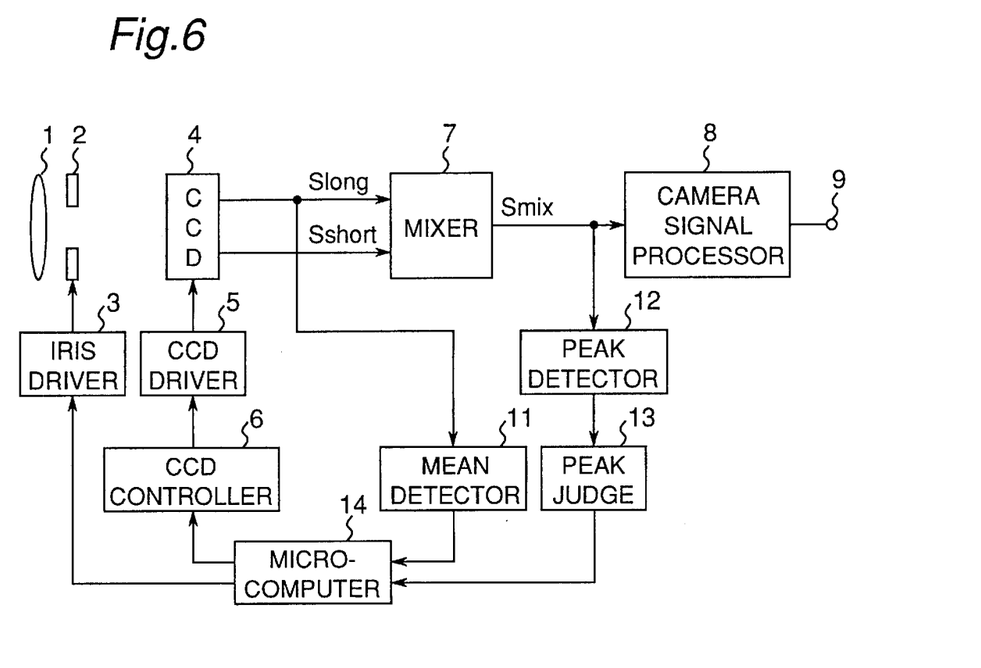
FIG. 6 is a block diagram of a main portion of an image pickup device according to a third embodiment of the invention.

FIG. 6 shows the image pickup device according to the third embodiment. The image pickup device is similar to that of the first embodiment except that the input signal of the mean signal level detector 11 is signal $S_{long}$ for the largest quantity of exposure in the signals for different quantities of exposure outputted by the image sensor 4. The mean signal level detector 11 averages signals $S_{long}$ over a screen and sends the mean value to the microcomputer 14. In the image pickup device, the structure and the operation of parts other than the mean signal level detector 11 are similar to the counterparts in the image pickup device of the first embodiment shown in FIG. 2, and the similar explanation is omitted here.

Figure 7:
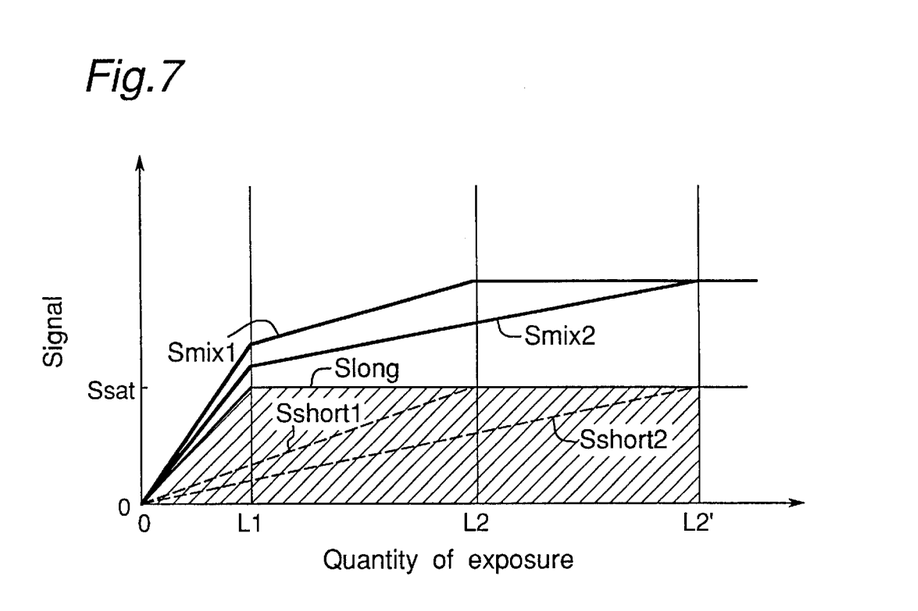
FIG. 7 is a diagram for illustrating the relationship between image signals in the third embodiment of the invention schematically.

FIG. 7 illustrates the relationship between image signals $S_{long}$, $S_{short}$ and $S_{mix}$. The characteristic of the signal $S_{long}$ is not changed practically when the dynamic range of the image sensor is changed according to that of an object. In this case, the mean signal level of the mixed signal $S_{mix}$ is taken as a trapezoid area (or a hatching area) enclosed by $S_{mix}$ and L2. The iris controller 6 controls the image sensor 4 by the driver 5 according to the mean signal level detected by the mean signal level detector 11. Then, if the ratio of the quantities of exposure of the image signals $S_{long}$ and $S_{short}$ is controlled, the iris state in the iris device 2 does not become unstable. It is advantageous that the iris device 2 can be controlled stably while controlling the dynamic ratio of the image pickup device in correspondence to the dynamic ratio of an object.

Fourth Embodiment

In the image pickup devices according to the first to third embodiments explained above, the quantity of exposure of the image sensor 4 is controlled so that the peak level of the output signal of the signal mixer 7 enters within a predetermined range. In this case, if signals having a very high dynamic range, such as a dark room and a bright sky, are received, the ratio of quantities of exposure is required to be larger than 100. However, when the signal mixer 7 adds signals $S_{long}$ and $S_{short}$ having a difference in quantity of exposure of 100 times or more, $S_{long}$ saturates even when signal $S_{short}$ is very small, and the difference in slope of gradation characteristic becomes 100 times. Thus, the image of the object becomes very unnatural.

Figure 9:
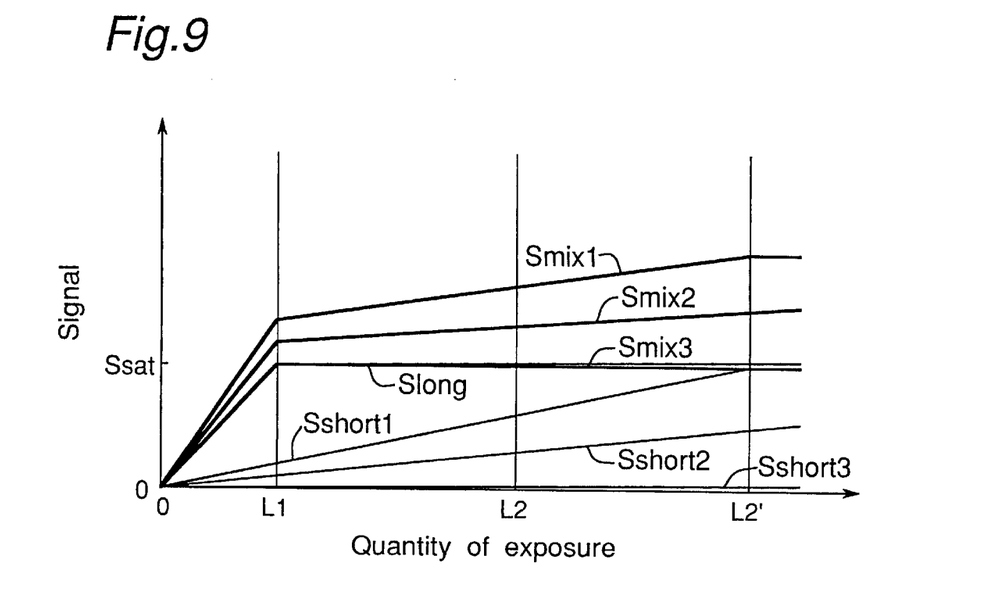
FIG. 9 is a diagram for illustrating the relationship between image signals in the fourth embodiment of the invention schematically.

FIG. 9 illustrates the relationship between image signals $S_{long}$, $S_{short}$ and $S_{mix}$. In FIG. 9, signal $S_{mix3}$ shows a mixed signal for the difference of 100 times schematically. The change in slope of the signal $S_{mix3}$ is very abrupt at the quantity of exposure of L1, and the signal is about the same as $S_{long}$ at a quantity of exposure smaller than L2'. The signal $S_{short}$ may be amplified in order to correct the difference in slope, but noises will become large for the gain of 100. Then, an image pickup device according to a fourth embodiment explained below suppresses an unnatural gradation characteristics and an increase in noises.

Figure 8:
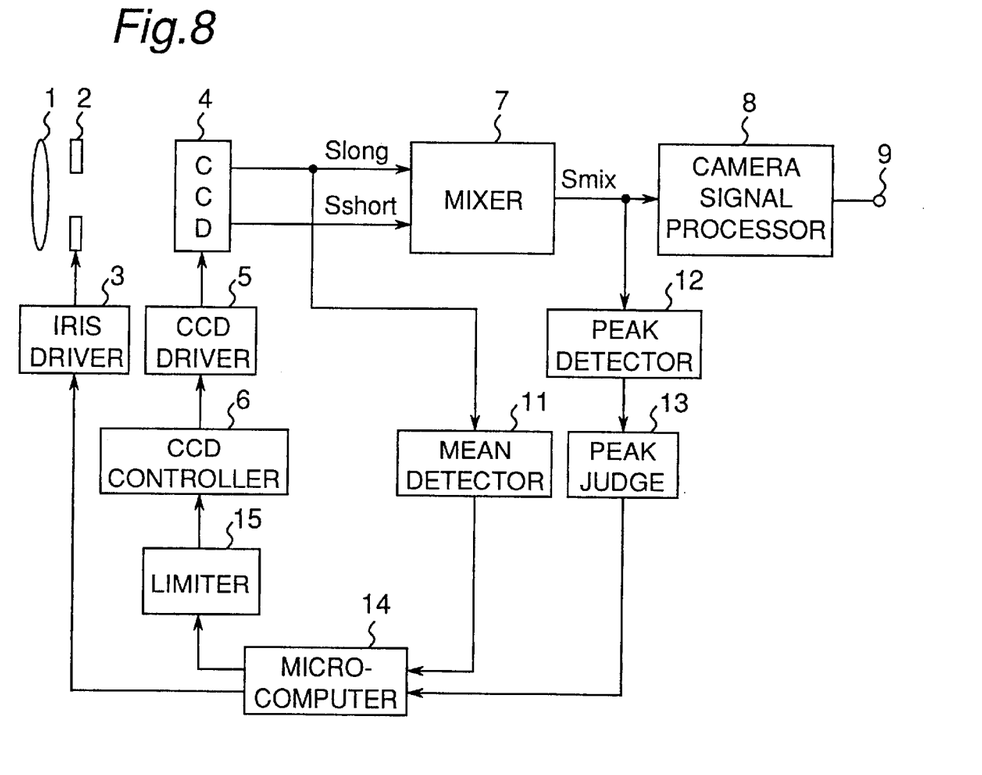
FIG. 8 is a block diagram of a main portion of an image pickup device according to a fourth embodiment of the invention.

FIG. 8 shows the image pickup device according to the fourth embodiment of the invention. The image pickup device according to this embodiment adds a limiter 15 to the image pickup device of the third embodiment. The limiter 15 limits that ratio of quantities of exposure given to the driver controller 6 for the image sensor 4. In the image pickup device, the structure and the operation of parts other than the limiter 15 are similar to the counterparts in the image pickup device of the third embodiment, and the similar explanation is omitted here.

When the microcomputer 14 receives a signal for changing the dynamic ratio from the peak judge 13, it sends an instruction to change the ratio of quantities of exposure to the limiter 15. The limiter 15 judges whether the ratio of the quantities of exposure exists in a predetermined range or not. If the ratio exists in the predetermined range, it sends a signal for changing the ratio to the controller 6 for the image sensor driver. On the other hand, if the ratio does not exist in the predetermined range, it holds the current ratio of quantities of exposure. The predetermined range of the ratio of quantities of exposure is for example, 3 to 32, or preferably 4 to 16.

FIG. 9 shows signal $S_{mix1}$ for the ratio of 4 and $S_{mix2}$ for the ratio of 8. The slope of gradation characteristic increases with an increase in the ratio of quantities of exposure. The gradation characteristic can be improved by amplifying $S_{short}$. However, by taking the amplified noises into account, amplification gain of 16 is the upper limit.

As explained above, the limiter 15 in the image pickup device of this embodiment limits the ratio of quantities of exposure in spite of the necessary ratio of quantities of exposure, so that the ratio of the quantities of exposure of the image signals $S_{long}$ and $S_{short}$ outputted by the image sensor 4 exists in the predetermined range. Then, the occurrences of the gradation characteristic becoming unnatural and an increase of the noises can be suppressed.

Fifth Embodiment

In the image pickup device according to the fourth embodiment explained above, the enhancement of dynamic range is limited. Then, the signal is liable to saturate completely for some objects and this makes it impossible to derive image information. Then, in an image pickup device according to a fifth embodiment, even when the enhancement of the dynamic range is limited, the iris function is correlated to the enlargement of dynamic range in order to decrease a ratio of saturated signals. Thus, the most appropriate imaging state is realized.

Figure 10:
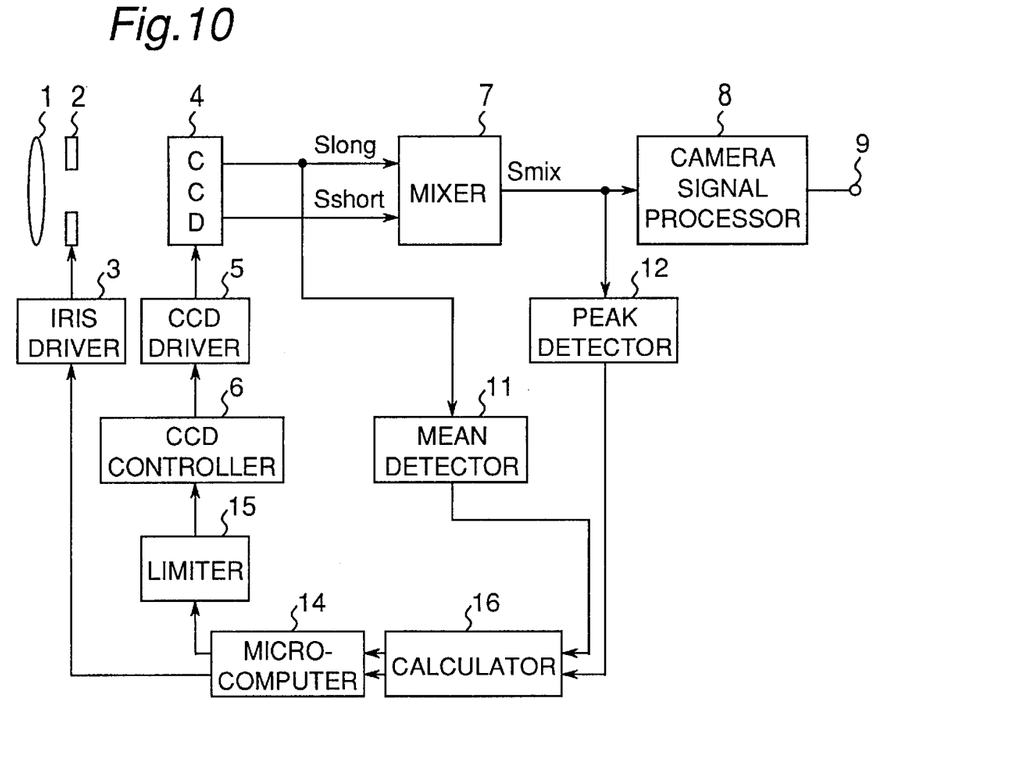
FIG. 10 is a block diagram of a main portion of an image pickup device according to a fifth embodiment of the invention.

FIG. 10 shows the image pickup device according to the fifth embodiment of the invention. The image pickup device adds a calculator 16 to the image pickup device of the fourth embodiment. In the image pickup device, the structure and the operation of parts other than the calculator 16 are similar to the counterparts in the image pickup device of the fourth embodiment, and the similar explanations omitted here.

The calculator 16 receives the mean value, MEAN, of signal levels outputted from the mean signal level detector 11 and the peak value, PEAK, outputted by the peak level detector 12 and determines the iris value according to the two input signals. The calculator 16 controls the iris value as explained below.

(1) First, if the mean value MEAN exists in a predetermined target range (from ML to MH), the calculator 16 outputs an instruction to the driver 3 through the microcomputer 14 to hold the current state of the iris device.

(2) If the mean value MEAN is larger than the maximum MH of the predetermined target range, the calculator 16 outputs an instruction to the driver 3 through the microcomputer 14 to close the iris device 2 by a predetermined difference.

(3) If the mean value MEAN is smaller than the minimum ML of the predetermined target range, the calculator 16 calculates whether the peak level, PEAK, of the mixed signal $S_{mix}$ exists within another predetermined level range (from PL to PH).

(4) If the peak value PEAK is smaller than the minimum PL of the predetermined level range, the calculator 16 outputs an instruction to the driver 3 through the microcomputer 14 to open the iris device 2 by the predetermined difference.

(5) If the peak value PEAK is larger than a value of P1=(PEAK−PMAX)/(ML−Mo)*(MEAN−Mo)+PMAX+dP, where "PMAX" represents the maximum value of PEAK and "dP" represents a shift for the peak value PEAK which does not change the iris state when the peak value exceeds PH, the calculator outputs an instruction to the driver 3 through the microcomputer 14 to close the iris device 2 by the predetermined difference.

(6) On the other hand, if the peak value, PEAK, is smaller than a value of P2=(PH−PMAX)/(ML−Mo)*(MEAN−Mo)+PMAX (=P1−dP), the calculator outputs an instruction to the driver 3 through the microcomputer 14 to open the iris device 2 by the predetermined difference.

Figure 11:
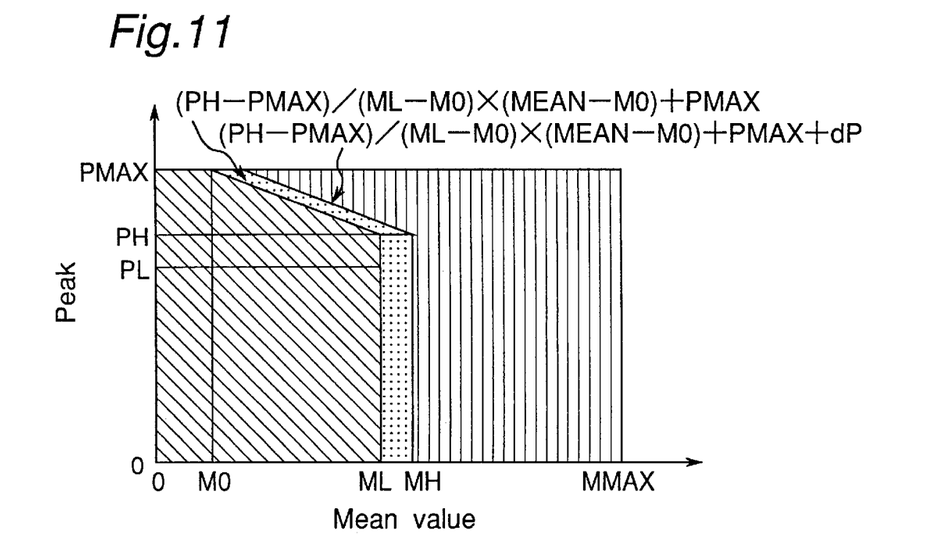
FIG. 11 is a block diagram of an internal structure of a calculator.

FIG. 11 shows relationship between the mean value MEAN and the peak value PEAK. In FIG. 11, the abscissa represents the mean value and the ordinate represents the peak value. An area illustrated with slant lines represents an area for controlling the opening of the iris device 2, while another area illustrated with vertical lines represents an area for controlling the closing of the iris device 2.

Figure 12:
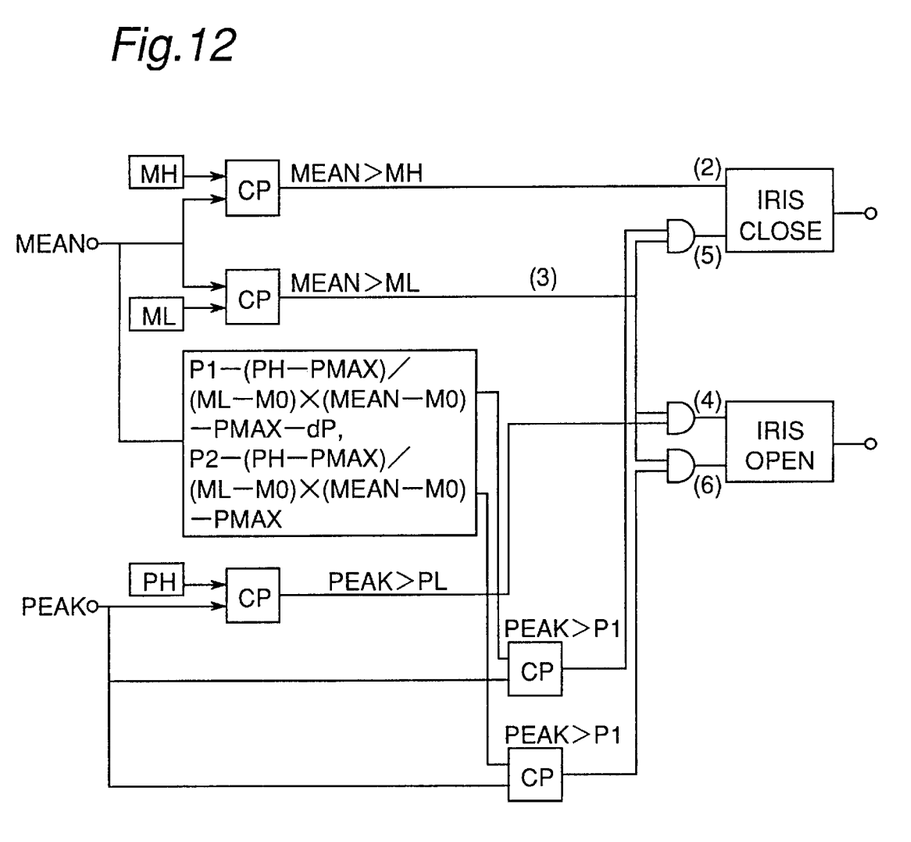
FIG. 12 is a flowchart of processes in calculation.
Figure 13:
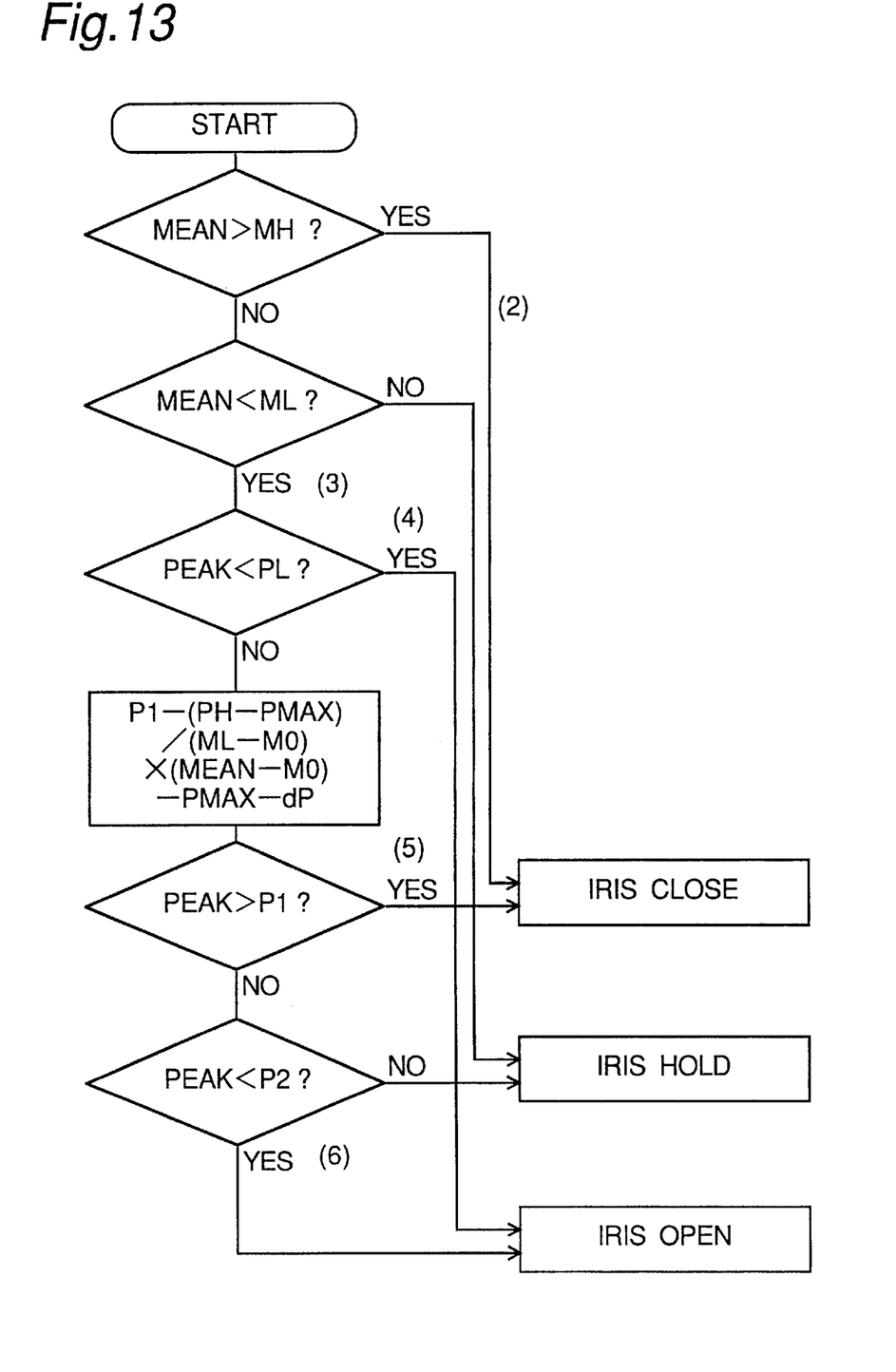
FIG. 13 is a diagram for illustrating a relationship between peak level PEAK of mixed signal and mean signal level MEAN of image signals for the largest quantity of exposure.

FIG. 12 shows a structure of the calculator 16 realized as a hardware circuit, wherein CP represents a comparator, and IRIS CLOSE and IRIS OPEN represent circuits to instruct a closing direction and an opening direction relative to the current iris value to the driver 3. It may also be possible to control the setting of the absolute iris value. FIG. 13 shows a flow of a computer program when the calculator 16 is realized as a software means. The flow corresponds to the above-mentioned steps (1) to (6), and it is not explained here again. Thus, the calculator 16 controls the iris device 2 to be opened or closed according to the mean value MEAN even when the peak value PEAK exceeds the predetermined range.

As explained above, the driver 5 for the image sensor and the iris device 2 are controlled by the controller 6 and the iris driver 3 according to the calculation result of the peak level and the average signal level. Then, even when the enlargement of the dynamic range of the image pickup device is limited, the pickup state for an object can be optimized as a result of cooperation Of the operation of the iris device 2 and the enlargement of the dynamic range. Then, a ratio of saturated signals is reduced, and an optimal pickup condition can be realized.

Sixth Embodiment

In the first to fifth embodiments, the peak level is detected on the mixed signals $S_{mix}$ outputted by the signal mixer 7. However, the signal level of the mixed signal $S_{mix}$ may depend on conditions of signal mixing. In a sixth embodiment, even when the signal level of the mixed signals $S_{mix}$ varies with conditions of signal mixing, the peak level is output stably.

Figure 14:
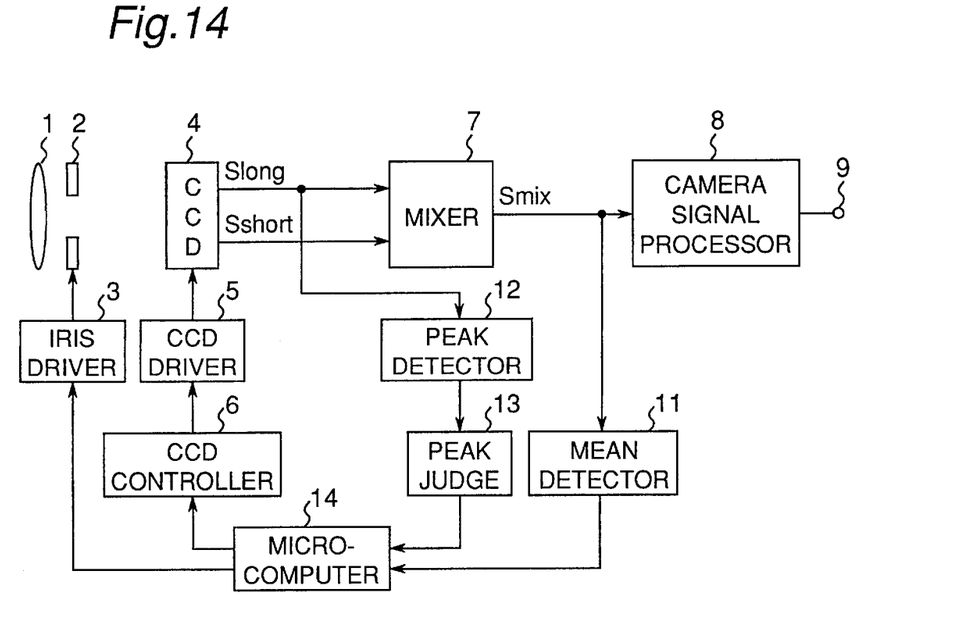
FIG. 14 is a block diagram of a main portion of an image pickup device according to a sixth embodiment of the invention.

FIG. 14 shows an image pickup device according to the sixth embodiment of the invention. The image pickup device is different from that of the first embodiment shown in FIG. 2 in that the input signal to the peak level detector 12 is a signal for the smallest quantity of exposure among the signals for a plurality of quantities of exposure outputted by the image sensor 4. In the image pickup device, the structure and the operation of parts other than the peak level detector 12 and the peak level judge 13 are similar to the counterparts in the image pickup device of the first embodiment, and the similar explanation is omitted here.

Figure 15:
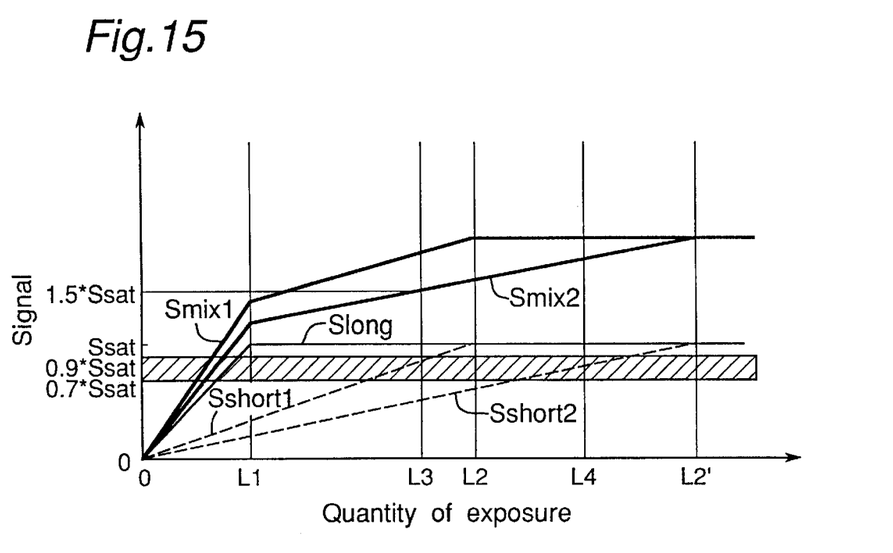
FIG. 15 is a diagram for illustrating the relationship between image signals in the sixth embodiment of the invention schematically.

The peak level detector 12 receives a signal $S_{short}$ for the smallest quantity of exposure among the signals for a plurality of quantities of exposure outputted by the image sensor 4 and detects the maximum level in signals over a screen to be output to the peak level judge 13. The peak level judge 13 decides whether the input peak level of image sensor $S_{short}$ is within a predetermined level range or not. The predetermined range is, for example, between 0.7 and 0.9 times the saturation level $S_{sat}$ of the image signals $S_{long}$ and $S_{short}$ (between $0.7*S_{sat}$ and $0.9*S_{sat}$). FIG. 15 illustrates the relationship between signals $S_{long}$, $S_{short}$ and $S_{mix}$ and the predetermined range for the peak level. The processing of signals after the microcomputer 14 is the same as the counterpart in the image pickup device of the first embodiment, and the explanation thereon is omitted.

In the image pickup device, the stable peak level is output because the input signal to the peak level detector 12 is a signal for the smallest quantity of exposure among the signals for a plurality of quantities of exposure outputted by the image sensor 4.

Though the signal mixer 7 in the image pickup device sums signals of different quantities of exposure similarly to the image pickup device according to the first embodiment, the signal mixing is not limited to the simple summation. For example, each signal may be amplified with an appropriate gain. In a different way, an appropriate offset level may be added. In this case, the peak level of the output signal $S_{mix}$ depends on the signal mixing conditions. However, because the peak level detector 12 receives the output signal of the image sensor, the peak level does not depend on the signal mixing conditions.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, the quantity of exposure is controlled with an electronic shutter in the first to sixth embodiments when the dynamic range is controlled. However, the quantity of exposure is not necessarily an exposure time. For example, a combination of an exposure time and an optical intensity may also be used as the quantity of exposure.

In the first to sixth embodiments, the signal for the smallest quantity of exposure is changed in order to control the ratio of quantities of exposure. However, for example, the signal for the largest quantity of exposure may be changed.

In the first to sixth embodiments, the image sensor of a progressive scan type is used. However, any image sensor may be used which outputs image signals for different quantities of exposure.

In the first to sixth embodiments, a monochromatic image sensor is used. However, instead of the monochromatic image sensor, a color image sensor may also be used, such as an image sensor of multi-elements with a prism, or an image sensor of a single element with color filters.

In the first to sixth embodiments, the image sensor 4 is used as an imaging means, and output signals thereof are mixed. However, the signal mixing may be performed similarly after the image signals are subjected to the conventional camera signal processing.

The peak detector 13 in the first to fourth and sixth embodiments may be constructed as a software program in the microcomputer 14.

The judgement of signal level in the signal level judge 10 in the second embodiment may be performed similarly by dividing a screen into a plurality of areas and by using the mean value in each area as an input signal. In this case, the signal level judge 10 and the mean signal detector 11 may be constructed as a software program in the microcomputer 14.

The limiter 15 in the fourth and fifth embodiments may also be constructed as a software program in the microcomputer 14.

The calculator 17 in the fifth embodiment may also be constructed as a software program in the microcomputer 14.

In the first to sixth embodiments, the microcomputer 14 is used as a means for controlling the dynamic range of the image pickup device. Alternatively, an exclusive control means may be provided for performing the above-mentioned control.

What is claimed is:

1. An image pickup device comprising:
   an optical lens operable to transmit light from an object;
   an image sensor operable to detect the light incoming from said optical lens to output image signals for different quantities of exposure;
   a driver operable to drive said image sensor;
   a signal mixer operable to mix the image signals for different quantities of exposure outputted by said image sensor to output a mixed signal;
   a peak level detector operable to detect a peak level of one of the image signals for different quantities of exposure or a signal derived from the image signals for different quantities of exposure;
   a peak level judge operable to judge whether the peak level detected by said peak level detector is within a predetermined range or not;
   a controller operable to control a ratio of the quantities of light for said image sensor according to the judge result of said peak level judge; and
   a limiter operable to limit a ratio of a quantity of exposure of the image signal controlled by said controller to be within a predetermined range of the ratio of the quantity of exposure.

2. The image pickup device according to claim 1, wherein said peak level detector is operable to detect a peak level of the mixed signals outputted by said signal mixer.

3. The image pickup device according to claim 1, wherein said peak level detector is operable to detect the peak level of the image signals for a smallest quantity of exposure.

4. The image pickup device according to claim 1, further comprising:
   an iris device operable to limit the light propagating from said optical lens to said image sensor;
   a signal level judge operable to receive the mixed signals from said signal mixer and output the mixed signals only existing within a predetermined range; and
   a mean signal level detector operable to detect a mean signal level of the image signals received from said signal level judge to output a mean signal level; and an iris driver operable to control said iris device according to the mean signal level outputted by said mean signal level detector.

5. The image pickup device according to claim 2, further comprising:
an iris device operable to limit the light propagating from said optical lens to said image sensor;
a signal level judge operable to receive the mixed signals from said signal mixer and output the mixed signals only existing within a predetermined range; and
a mean signal level detector operable to detect a mean signal level of the image signals received from said signal level judge to output a mean signal level; and
an iris driver operable to control said iris device according to the mean signal level outputted by said mean signal level detector.

6. The image pickup device according to claim 3, further comprising:
an iris device operable to limit the light propagating from said optical lens to said image sensor;
a signal level judge operable to receive the mixed signals from said signal mixer and output the mixed signals only existing within a predetermined range; and
a mean signal level detector operable to detect a mean signal level of the image signals received from said signal level judge to output a mean signal level; and
an iris driver operable to control said iris device according to the mean signal level outputted by said mean signal level detector.

7. The image pickup device according to claim 1, further comprising:
an iris device operable to limit the light propagating from said optical lens to said image sensor;
a mean signal level detector operable to average the image signals for a maximum quantity of exposure outputted by said image sensor to output a mean signal level; and
an iris driver operable to control said iris device according to the mean signal level outputted by said mean signal level detector.

8. The image pickup device according to claim 2, further comprising:
an iris device operable to limit the light propagating from said optical lens to said image sensor;
a mean signal level detector operable to average the image signals for a maximum quantity of exposure outputted by said image sensor to output a mean signal level; and
an iris driver operable to control said iris device according to the mean signal level outputted by said mean signal level detector.

9. The image pickup device according to claim 3, further comprising:
an iris device operable to limit the light propagating from said optical lens to said image sensor;
a mean signal level detector operable to average the image signals for a maximum quantity of exposure outputted by said image sensor to output a mean signal level; and
an iris driver operable to control said iris device according to the mean signal level outputted by said mean signal level detector.

10. The image pickup device according to claim 4, further comprising a calculator operable to calculate a ratio of quantities of exposure of the image signals outputted by said image sensor and a quantity of incident light incoming through said iris device to said image sensor by performing a calculation with the peak level and the mean signal level.

11. The image pickup device according to claim 7, further comprising a calculator operable to calculate a ratio of quantities of exposure of the image signals outputted by said image sensor and a quantity of incident light incoming through said iris device to said image sensor by performing a calculation with the peak level and the mean signal level.

12. The image pickup device according to claim 1, wherein said limiter is operable to judge whether the ratio of the quantity of exposure exists within the predetermined range.

13. The image pickup device according to claim 1, further comprising a camera signal processing circuit operable to receive the mixed signal output from said signal mixer and perform signal processing to the mixed signal.

14. The image pickup device according to claim 1, wherein said image sensor is a monochromatic image sensor.

15. The image pickup device according to claim 1, wherein said image sensor is a color image sensor.

16. The image pickup device according to claim 4, wherein said signal level judge is operable to decide whether a level of the mixed signals is within the predetermined range.

17. The image pickup device according to claim 5, wherein said signal level judge is operable to decide whether a level of the mixed signals is within the predetermined range.

18. The image pickup device according to claim 6, wherein said signal level judge is operable to decide whether a level of the mixed signals is within the predetermined range.

19. An image pickup method comprising:
transmitting light from an object;
detecting the transmitted light and outputting image signals for different quantities of exposure;
driving an image sensor;
mixing the image signals for different quantities of exposure outputted by the image sensor to output a mixed signal;
detecting a peak level of one of the image signals for different quantities of exposure or a signal derived from the image signals for different quantities of exposure;
judging whether the peak level detected in said detecting is within a predetermined range or not;
controlling a ratio of the quantities of light for the image sensor according to the judge result of said judging;
limiting a ratio of a quantity of exposure of the image signal controlled in said controlling to be within a predetermined range of the ratio of the quantity of exposure.

* * * * *